March 17, 1936.   T. H. MILLER   2,034,525
CENTRIFUGAL MACHINE
Filed Sept. 14, 1933   2 Sheets-Sheet 1
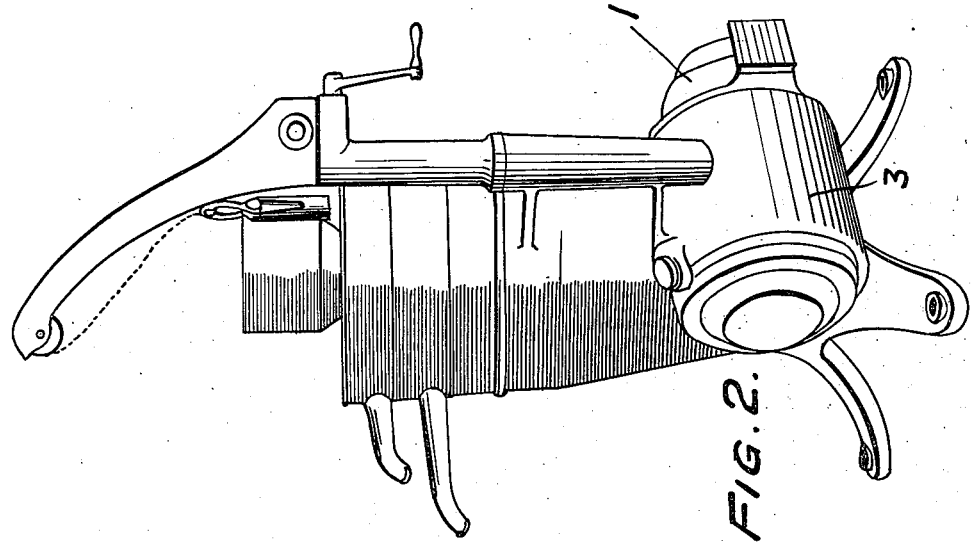
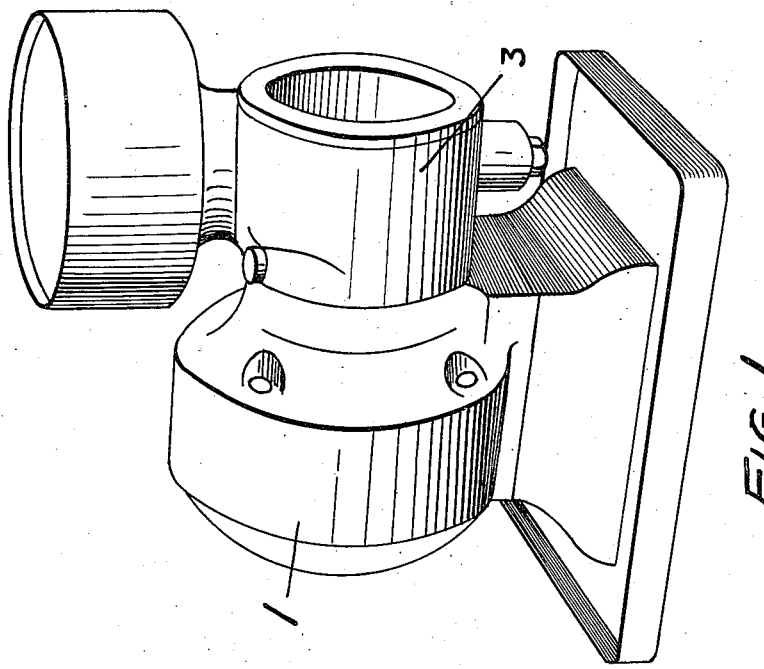
INVENTOR
Theodore H. Miller
BY
Busser and Harding
ATTORNEYS.
WITNESS:

March 17, 1936.    T. H. MILLER    2,034,525
CENTRIFUGAL MACHINE
Filed Sept. 14, 1933    2 Sheets-Sheet 2
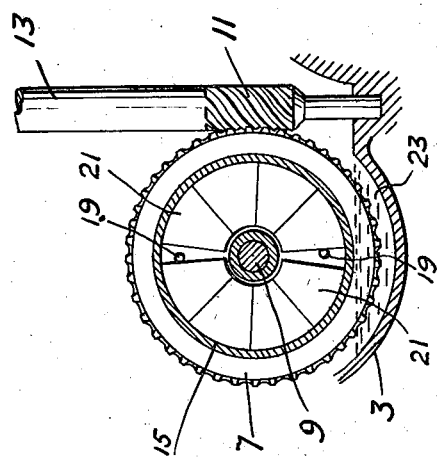
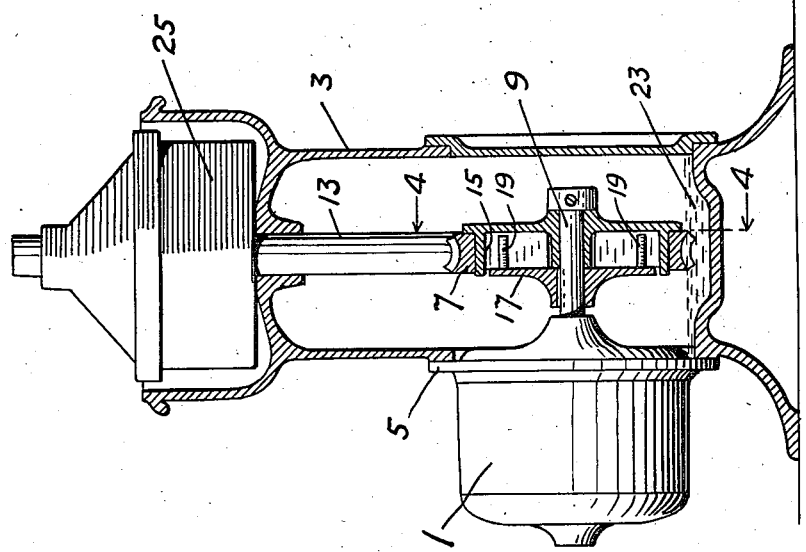
INVENTOR
Theodore H. Miller
BY
ATTORNEYS.

Patented Mar. 17, 1936

2,034,525

UNITED STATES PATENT OFFICE 2,034,525

CENTRIFUGAL MACHINE

Theodore H. Miller, Poughkeepsie, N. Y., assignor to The De Laval Separator Company, New York, N. Y., a corporation of New Jersey Application September 14, 1933, Serial No. 689,489

1 Claim. (Cl. 74—425)

My invention relates to an improvement in centrifugal machines, and more particularly to an improvement in the frame and driving mechanism thereof.

I have discovered that frames and motors for centrifugal machines may be connected together with one end bell of the motor projecting into the frame and with part of the driving gearing mounted directly on the motor shaft. For small machines the frame may be conveniently mounted on and supported by the motor while for large machines it is more convenient to support the motor from the frame.

In the accompanying drawings Fig. 1 is a perspective view of a small machine;

Fig. 2 is a perspective view of a large machine;

Fig. 3 is an elevation, partly in section of the machine shown in Fig. 1; and

Fig. 4 is a section on line 4—4 of Fig. 3.

The driving motor, which may be, for example, a horizontal two-bearing shaft electric motor, is indicated at 1, and is bolted to casing 3 by means of the flange 5, thus forming the closure for one end of the casing.

7 is a worm wheel having an internal friction surface 15 mounted on shaft 9 of the motor so as to be rotatable independently thereof, and meshing with a worm screw 11 carried by bowl spindle 13. Keyed to the motor shaft adjacent the worm wheel is a friction clutch driving spider 17 having pins 19 projecting inside the worm wheel between a set of weights 21 which are thereby compelled to rotate with shaft 9. The lower portion of the gear enclosure is adapted to hold oil 23 into which the worm wheel dips.

In operation as the motor shaft 9 revolves it carries with it the spider 17 with pins 19 that drive the weights 21. Centrifugal force causes the weights to fly out against the surface 15 with great force, causing friction which drags the surface and the worm wheel with the weights until they attain the same speed as the motor. The worm wheel, by meshing with the worm screw 11, drives it and with it the spindle 13 and the bowl 25.

The lower portion of the casing 3 is of cylindrical shape and concentric with the motor shaft, the gear wheel and the cylindrical clutch members. The worm wheel dipping into the oil in the lower part of the casing picks it up and throws it around the inside of the casing whence it splashes inside the clutch and around the other mechanism, thoroughly lubricating them. The upper part of the casing 3 is of cylindrical shape and concentric with spindle 13.

This simplified construction, in which the motor shaft, without any external bearings becomes the worm wheel shaft, materially reduces the cost of machines.

It is to be understood that my invention comprises the combination and arrangement of elements defined in the claim and does not necessarily embody certain described and illustrated structural details which the claim does not specifically recite.

The friction clutch herein described is not claimed per se, as it forms the subject matter of my co-pending application, Serial No. 636,103, filed October 10, 1932.

What I claim and desire to protect by Letters Patent is:

In a centrifugal machine, the combination with a vertical rotating spindle, a driving motor and its shaft and frame, a gear which is mounted and turnable on the motor shaft and having a periphery engaging said spindle, and a centrifugal clutch member secured to the motor shaft, of clutch members extending inside the gear wheel and between it and the motor shaft and in concentric relation with both, a casing enclosing the motor shaft, clutch and gear wheel, the lower portion of which is of cylindrical shape adapted to hold a pool of oil and open at both ends and concentric with the motor shaft and the upper part of which is of cylindrical shape concentric with the spindle, the motor frame closing one end of the lower portion of the casing, the motor shaft being unsupported beyond the gear wheel, and a removable plate closing the other end of the lower part of the casing and spaced from the unsupported end of the motor shaft, that carries the gear and clutch.

THEODORE H. MILLER.